United States Patent [19]

Vo

[11] Patent Number: 5,168,561

[45] Date of Patent: Dec. 1, 1992

[54] PIPE-LINE METHOD AND APPARATUS FOR BYTE ALIGNMENT OF DATA WORDS DURING DIRECT MEMORY ACCESS TRANSFERS

[75] Inventor: Tri T. Vo, San Diego, Calif.

[73] Assignee: NCR Corporation, Dayton, Ohio

[21] Appl. No.: 481,098

[22] Filed: Feb. 16, 1990

[51] Int. Cl.[5] .............................. G06F 12/04
[52] U.S. Cl. .................... 395/425; 395/400;
 364/DIG. 1; 364/DIG. 2
[58] Field of Search ... 364/200 MS File, 900 MS File;
 395/400 MS File, 425 MS File

[56] References Cited

U.S. PATENT DOCUMENTS

| | | | |
|---|---|---|---|
| 3,341,817 | 9/1967 | Smeltzer | 340/172.5 |
| 3,573,744 | 4/1971 | Rigazie | 340/172.5 |
| 3,916,388 | 10/1975 | Shimp et al. | 340/172.5 |
| 4,321,665 | 3/1982 | Shen et al. | 364/200 |
| 4,507,731 | 3/1985 | Morrison | 361/92 |
| 4,604,695 | 8/1986 | Widen et al. | 364/200 |
| 4,814,976 | 3/1989 | Hansen et al. | 364/200 |
| 4,959,779 | 9/1990 | Weber et al. | 364/200 |
| 4,961,162 | 10/1990 | Nguyenphu et al. | 364/748 |
| 5,051,894 | 9/1991 | Phillips et al. | 364/200 |

Primary Examiner—Joseph L. Dixon
Assistant Examiner—Reba I. Elmore
Attorney, Agent, or Firm—James M. Stover

[57] ABSTRACT

Apparatus for correcting the byte alignment of multiple-byte data words during DMA word transfers. The apparatus includes a four-byte input word bus and a four-byte output word bus. A carrier register stores the second, third and fourth bytes of a first four-byte data word received on the input bus. A data selector including four 4:1 multiplexers determines which of the three stored word bytes and which of four bytes corresponding to a second data word received on the input bus should be placed on the four-byte output word bus and the sequential order of the bytes on the bus.

5 Claims, 3 Drawing Sheets

| WORD ADDRESS | MEMORY CONTENT | | | |
|---|---|---|---|---|
| | BYTE 0 (32 — 24:23) | BYTE 1 (—16:15) | BYTE 2 (—8:7) | BYTE 3 (—0) |
| | 00 | 01 | 10 | 11 |
| 0000000000 | 11000101 | 11100101 | 11000101 | 11011001 |
| 0000000100 | 11101000 | 11000111 | 11010110 | 11010110 |
| 0000001000 | 11000100 | 11000010 | 11010110 | 11101000 |
| 0000001100 | 11000100 | 11010110 | 11000101 | 11100010 |
| 0000010000 | 11000110 | 11001001 | 11010101 | 11000101 |
| • | | | | |
| • | | | | |
| • | | | | |
| 1111111100 | 11000110 | 11000001 | 11000011 | 11000101 |

FIG. 1

MEMORY CONTENT

| WORD ADDRESS | BYTE 0 (32:24) | BYTE 1 (24:16) | BYTE 2 (16:8) | BYTE 3 (8:0) |
|---|---|---|---|---|
| 0000000000 | 11000101 | 11100101 | 11000101 | 11011001 |
| 0000000100 | 11101000 | 11000111 | 11010110 | 11010110 |
| 0000001000 | 11000100 | 11000010 | 11010110 | 11101000 |
| 0000001100 | 11000100 | 11010110 | 11000101 | 11100010 |
| 0000010000 | 11000110 | 11001001 | 11010101 | 11000101 |
| ... | | | | |
| 1111111100 | 11000110 | 11000001 | 11000011 | 11000101 |

PIPE-LINE METHOD AND APPARATUS FOR BYTE ALIGNMENT OF DATA WORDS DURING DIRECT MEMORY ACCESS TRANSFERS

The present invention relates generally to direct memory access (DMA) transfers between two memories and, more particularly, to an apparatus for byte-aligning word data during DMA transfers.

BACKGROUND OF THE INVENTION

The transfer of large blocks of data between an agent memory within a computer and a second storage device, such as a magnetic disk or other memory device, is often most efficiently accomplished through a transfer technique called direct memory access (DMA). In direct memory access, data is transferred into and out of the computer memory through the memory bus under the management of a DMA controller. The computer's central processing unit (CPU) initiates the transfer by supplying the DMA controller with the starting address of the memory block where data is to be read or stored, depending on the direction of the data transfer, and the number of words to be transferred. After that, the DMA controller starts and continues the transfer of data into or out of the memory, removing the CPU from the transfer operation to perform other functions.

A problem can arise during DMA transfers of multi-byte word data when the fetching address of the sending agent memory or the storing address of the receiving agent memory does not start at a word-boundary location. One method of addressing this problem is to convert the DMA word transfer into a DMA byte transfer, transferring the data in bytes containing eight bits rather than in multi-byte words containing sixteen, twenty-four, thirty-two, or possibly more data bits. This method obviously reduces performance of the transfer operation. A second solution of the above-described word transfer problem requires transfer of the multi-byte word data to a temporary buffer area in the receiving agent memory. Software on the receiving agent has to move and also byte-align the raw word data from the temporary storage buffer to its required location. This method also severely reduces the performance of the transfer operation.

OBJECTS OF THE INVENTION

It is therefore a primary object of the present invention to provide a new and improved apparatus for aligning data as it is transferred between memory devices.

It is another object of the present invention to provide such an apparatus which re-aligns multi-byte word data during DMA data transfer operations.

It is yet another object of the present invention to provide an apparatus which re-aligns multi-byte word data during transfer operations to correct problems which arise when the fetching address or storing address of the word data to be transferred does not start at a word-boundary location.

SUMMARY OF THE INVENTION

There is provided, in accordance with the present invention, an apparatus for changing the byte alignment of multiple-byte data words during DMA word transfers. The apparatus includes an input word bus; an output word bus; means connected to receive word byte data from the input bus for latching and holding byte data obtained from a first data word appearing on the input bus; and means connected to receive word byte data from the latching means and the input bus for selecting word byte data from the latch means and word byte data from a second word appearing on the input bus. This selecting means combines the selected first word byte data obtained from the latch means with the selected second word byte data obtained from the input word bus to form a re-aligned data word and provides the re-aligned data word to the output bus.

In the described embodiment, the input and output busses are shown to be thirty-two bit (four byte) word data busses. The latching means includes a first carrier register connected to receive from the input word bus the second byte of any data word appearing on said word bus; a second carrier register connected to receive the third byte of any data word appearing on the input word bus; and a third carrier register connected to receive the fourth byte of any data word appearing on the input word bus. The three carrier registers are responsive to the receipt of a clock pulse to latch and hold received word byte data. The selecting means includes inputs for receiving first and second select signals, the select signals being the last two bits of the starting address of the memory block where data is to be read or stored; a first 4:1 multiplexer connected to receive as inputs the first byte of any data word appearing on the input bus and the outputs of the first, second and third carrier registers; a second 4:1 multiplexer connected to receive as inputs the first and second bytes of any data word appearing on the input bus and the outputs of the first and second carrier registers; a third 4:1 multiplexer connected to receive as inputs the first, second and third bytes of any data word appearing on the input bus and the output of the first carrier register; and a fourth 4:1 multiplexer connected to receive as inputs the first, second, third and fourth bytes of any data word appearing on the input bus. Each of the multiplexers has a single output and is responsive to the select signals to gate a selected multiplexer input to the multiplexer output. The four multiplexer outputs are provided to first, second, third and fourth output registers, respectively. The output registers are responsive to the clock signal to latch and hold the received data and provide the four word bytes to the output word bus.

The above objects and other objects, features, and advantages of the present invention will become apparent from the following detailed specification when read in conjunction with the accompanying drawings.

BRIEF DESCRIPTION OF THE DRAWINGS

FIG. 1 illustrates a 256 word memory, wherein each word includes four eight-bit word bytes.

DETAILED DESCRIPTION OF THE PREFERRED EMBODIMENT

Referring now to FIG. 1, there is seen an illustration of a 256 word memory. A word in memory is an entirety of bits which move in and out of storage as a unit. A memory word may represent a group of alphanumeric characters, an instruction, an operand, or any binary coded information. Most computer memories use words that are multiples of eight bits, a group defined as a byte, in length. In FIG. 1 it is seen that each word comprises 32 bits, or four bytes, of data. Each word and byte in the memory is assigned an identification number called an address. Word addresses, in binary, are provided in the leftmost column of FIG. 1. The byte address for a word byte shown in the figure can be determined by adding the binary number 00, 01, 10 or 11 to the associated word address. For example, the bytes which form the word stored at address 0000001000 would have addresses of 0000001000, 0000001001, 0000001010 and 0000001011, respectively. Storing, reading and processing data in multi-byte words rather than in individual bytes reduces processing time and increases efficiency for some applications.

Figure 2:
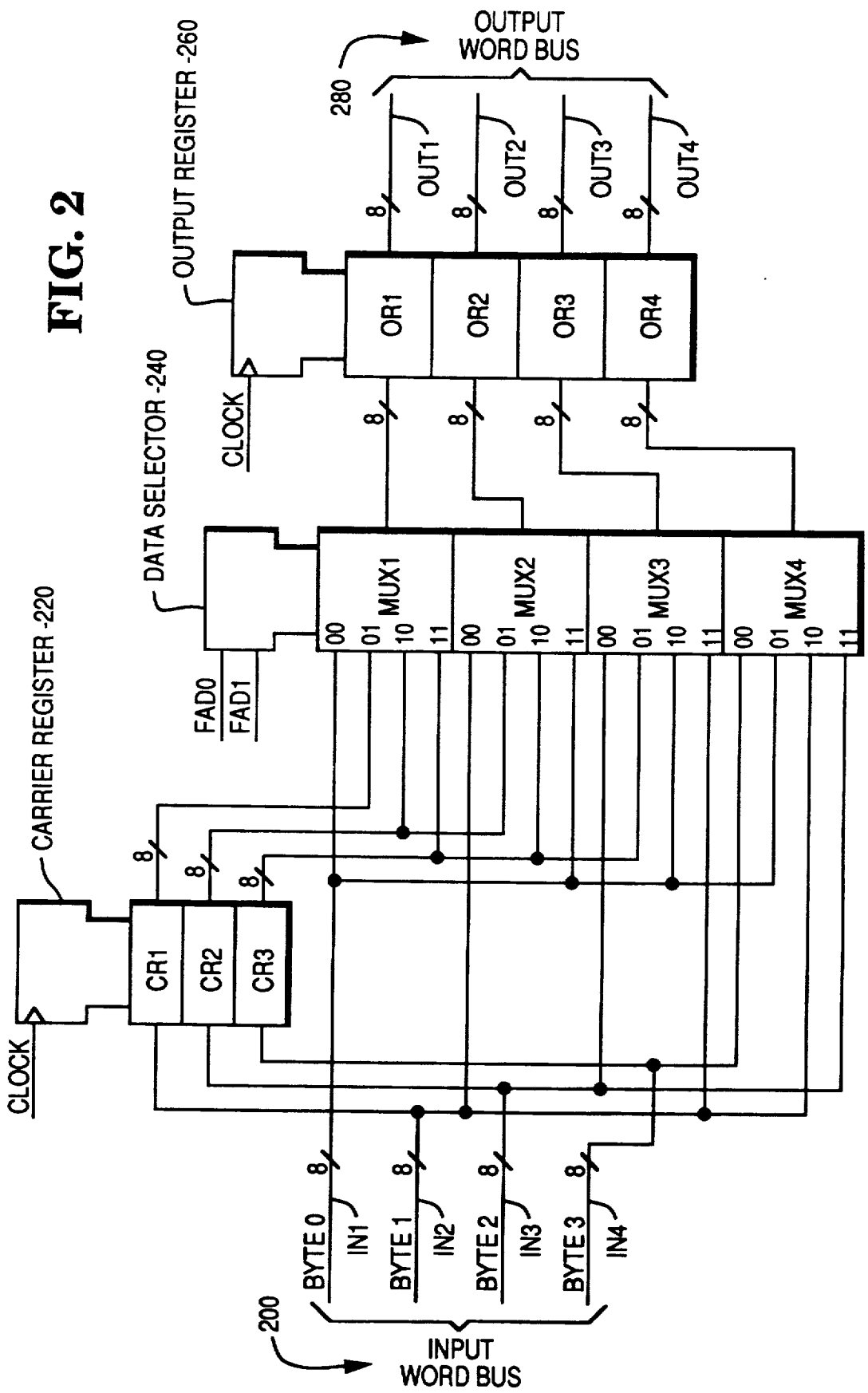
FIG. 2 is a block diagram illustration of an embodiment of the present invention which prepares word data for transfer by re-aligning the word bytes in accordance with the fetching address in the sending agent memory.

FIG. 2 is a block diagram illustration of an embodiment of the present invention which prepares word data read from a sending agent memory for transfer by re-aligning the word bytes in accordance with the fetching address in the sending agent memory. The circuit includes a thirty-two line (four byte) input word bus 200, a carrier register 220, a data selector 240, an output register 260 and a thirty-two line output word bus 280 connected together as described below.

Each of word buses 200 and 280 are shown to comprise four lines. The four input word bus lines are identified as IN1, IN2, IN3 and IN4, while the four output word bus lines include are designated OUT1, OUT2, OUT3 and OUT4. Although the input and output word buses and the connections between the elements identified in the preceding paragraph are shown as single lines, it should be understood that each line actually represents a group of eight conductors capable of transmitting in parallel fashion eight-bit data bytes. Only the lines identified as CLOCK, FAD0 and FAD1 are intended to represent single conductors.

Carrier register 220 includes three eight-bit registers identified as CR1, CR2 and CR3, respectively, and an input designated CLOCK. Register CR1 is connected to line IN2 to receive from input word bus 200 the eight bits of data which form the second byte (byte1) of any word placed on the bus. Registers CR2 and CR3 are similarly connected to lines IN3 and IN4 to receive from the input word bus the third byte (byte2) and fourth byte (byte3), respectively, of any word placed on the bus. Each of registers CR1, CR2 and CR3 functions to latch and hold received byte data when the leading edge of a logic pulse is received at the CLOCK input.

Data selector 240 comprises four 4:1 multiplexers, designated as MUX1, MUX2, MUX3 and MUX4, and two select inputs, FAD0 and FAD1. Each of the multiplexers has four inputs, labeled 00, 01, 10 and 11, and a single output, each input and output including eight data conductors. Each multiplexer is responsive to logic signals received at inputs FAD1 and FAD0 to selectively couple one of the inputs to the output. Multiplexer inputs 00 are provided to the respective outputs if FAD1 and FAD0 each have a logic level of 0, inputs 01 are provided to the outputs when FAD1=0 and FAD0=1, inputs 10 are provided to the outputs when FAD1=1 and FAD0=0 and inputs 11 are provided to the outputs when FAD1 and FAD0 each have a logic level of 1.

Multiplexer MUX1 is connected to receive byte data from line IN1 (byte0) at its 00 input, the output of register CR1 at its 01 input, the output of register CR2 at its 10 input and the output of register CR3 at its 11 input. Multiplexer MUX2 is connected to receive byte data from input lines IN2 and IN3 at its 00 and 11 inputs, respectively, and the outputs of registers CR2 and CR3 at its 01 and 10 inputs, respectively. Multiplexer MUX3 is connected to receive, in the following order, at its 00, 01, 10 and 11 inputs: byte data from input line IN3, the output of register CR3, byte data from line IN1 and byte data from line IN2. The remaining multiplexer, MUX4, receives byte data from input line IN4 at input 00, byte data from line IN1 at input 01, byte data from line IN2 at input 10 and byte data from line IN3 at input 11.

Output register 260 includes four eight-bit registers, labeled OR1, OR2, OR3 and OR4, and an input for a clock signal designated CLOCK. Register OR1 is connected to receive the output of multiplexer MUX1, register OR2 is connected to receive the output of multiplexer MUX2, register OR3 is connected to receive the output of multiplexer MUX3 and register OR4 is connected to receive the output of multiplexer MUX4. The outputs of register OR1 through OR4 form output word bus 280.

The operation of the circuit of FIG. 2 will now be explained. When a request has been made by the CPU to transfer data from a memory, the DMA controller must be provided with the fetching address of the memory location from where data is to be obtained. The DMA controller starts the transfer operation by placing a first data word obtained from the word address which contains the specified fetching address onto input word bus 200. Additional data words, obtained from sequential word addresses in the memory, are thereafter placed onto the input word bus at the frequency of the clock signal, a new data word being placed onto the word bus at each occurrence of every new clock pulse.

The specified fetching address can be any byte address. The last two binary digits of the specified fetching address, identified as FAD1 and FAD0, respectively, determine the manner in which the word bytes are re-aligned. Thus, four situations, illustrated in the following table, and discussed in greater detail below, are possible. Word bytes are identified by the capital letters A through H.

TABLE 1

| Word Address | Case 1<br>FAD1,FAD0 =<br>0,0 | Case 2<br>FAD1,FAD0 =<br>0,1 |
|---|---|---|
| 0000 | :A :B :C :D: | : :A :B :C : |
| 0100 | :E :F :G :H : | :D :E :F :G : |
| 1000 | : : : : | :H : : : |

| Word Address | Case 3<br>FAD1,FAD0 =<br>1,0 | Case 4<br>FAD1,FAD0 =<br>1,1 |
|---|---|---|
| 0000 | : : :A :B : | : : : :A : |
| 0100 | :C :D :E :F : | :B :C :D :E : |
| 1000 | :G :H : : | :F :G :H : : |

Case 1: FAD1, FAD0=0,0

In this case, the fetching address is also a word address so there is no need to byte-align the data prior to transfer. Word bytes A, B, C and D are read from memory and placed onto input word bus 200, lines IN1, IN2, IN3 and IN4, respectively. Data selector 240 is responsive to address signals FAD1 and FAD0 (0, 0) to couple line IN1 to register OR1, line IN2 to register OR2, line IN3 to register OR3 and line IN4 to register OR4. The output register is responsive to the leading edge of a clock pulse received at its CLOCK input to latch bytes A, B, C and D and provide the latched word bytes to output word bus lines OUT1, OUT2, OUT3 and OUT4, respectively.

Case 2: FAD1, FAD0 = 0,1

The first memory read operation extracts three bytes (A, B and C) of data from the sending memory, placing byte A onto line IN2, byte B onto line IN3 and byte C onto line IN4. The first rising edge of the clock signal latches bytes A, B and C into registers CR1, CR2 and CR3, the outputs of which are connected to the 01 inputs of multiplexers MUX1, MUX2 and MUX3, respectively. A second data word, comprising bytes D, E, F and G is then placed on the input word bus, byte D being provided via line IN1 to input 01 of MUX4. Data selector 240 is responsive to the signals FAD1 and FAD0 (0, 1) to provide byte A from register CR1 to the input of register OR1, byte B from register CR2 to the input of register OR2, byte C from register CR3 to the input of register OR3, and byte D from line IN1 to the input of register OR4.

At the second rising edge of the clock signal, registers OR1, OR2, OR3 and OR4 latch bytes A, B, C and D which are then provided to output lines OUT1, OUT2, OUT3 and OUT4, respectively. In addition, this second rising edge latches word bytes E, F and G into registers CR1, CR2 and CR3, respectively, replacing the earlier stored values. A third data word, beginning with byte H is then placed onto the input word bus.

The operation continues with each clock pulse producing an output word comprised of three bytes previously stored in carrier register 220 (byte1, byte2 and byte3) and one byte (byte0) from the data word newly fetched from memory.

Case 3: FAD1, FAD0 = 1,0

The first memory read operation extracts two bytes (A and B) of data from the sending memory, placing byte A onto line IN3, byte B onto line IN4. The first rising edge of the clock signal latches bytes A and B into registers CR2 and CR3, the outputs of which are connected to the 10 inputs of multiplexers MUX1 and MUX2, respectively. A second data word, comprising bytes C, D, E and F is then placed on the input word bus, byte C being provided via line IN1 to input 10 of MUX3 and byte D being provided via line IN2 to input 10 of MUX4. Data selector 240 is responsive to the signals FAD1 and FAD0 (1, 0) to provide byte A from register CR2 to the input of register OR1, byte B from register CR3 to the input of register OR2, byte C from register from line IN1 to the input of register OR3, and byte D from line IN1 to the input of register OR4.

At the second rising edge of the clock signal, registers OR1, OR2, OR3 and OR4 latch bytes A, B, C and D which are then provided to output lines OUT1, OUT2, OUT3 and OUT4, respectively. In addition, this second rising edge latches word bytes E and F into registers CR2 and CR3, respectively, replacing the earlier stored values. A third data word, beginning with bytes G and H is then placed onto the input word bus.

With each clock pulse, an output word comprised of two bytes previously stored in carrier register 220 (byte2 and byte3) and two bytes (byte0 and byte1) from the data word newly fetched from memory is produced.

Case 4: FAD1, FAD0 = 1,1

One byte (A) of data is extracted from the sending memory and placed onto line IN4 during the first read operation. The first rising edge of the clock signal latches byte A into register CR3, the output of which is connected to the 11 input of multiplexer MUX1. A second data word, comprising bytes B, C, D and E is thereafter placed on the input word bus, byte B being provided via line IN1 to input 11 of MUX2, byte C being provided via line IN2 to input 11 of MUX3 and byte D being provided via line IN3 to input 11 of MUX4. Signals FAD1 and FAD0 (1, 1) direct data selector 240 to provide byte A from register CR2 to the input of register OR1, byte B from line IN1 to the input of register OR2, byte C from register from line IN1 to the input of register OR3, and byte D from line IN1 to the input of register OR4.

The next rising edge of the clock signal latches bytes A, B, C and D into registers OR1, OR2, OR3 and OR4. The output register provides the realigned word to output lines OUT1, OUT2, OUT3 and OUT4, respectively. This second rising edge also latches word byte E into register CR3, replacing the earlier stored value. A third data word, beginning with bytes F, G and H is then placed onto the input word bus.

The operation continues with each clock pulse producing an output word comprised of one byte previously stored in carrier register 220 (byte3) and three bytes (byte0, byte1 and byte2) from the data word newly fetched from memory.

Figure 3:
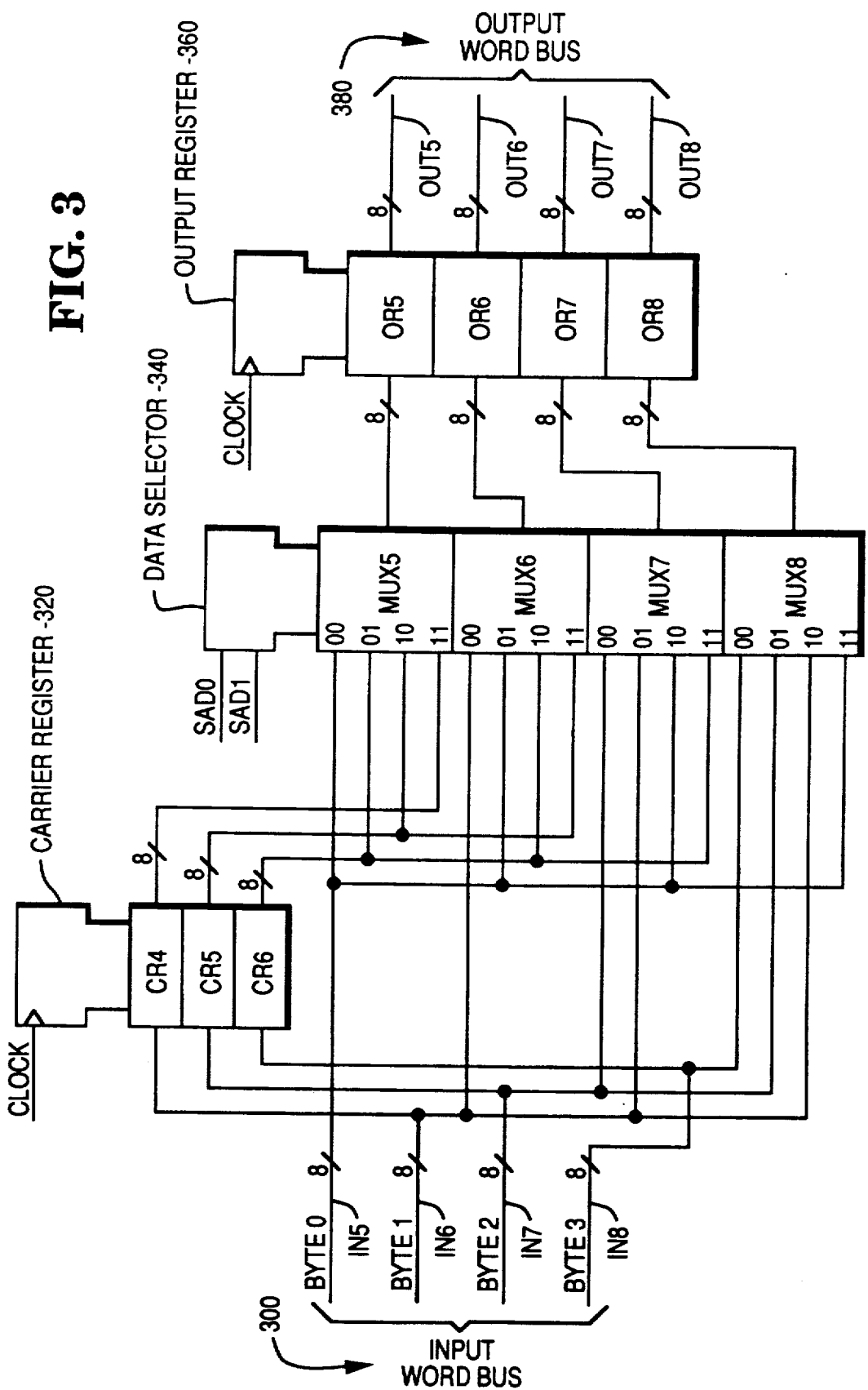
FIG. 3 is a block diagram illustration of an embodiment of the present invention which prepares transferred word data for storage by re-aligning the word bytes in accordance with the storing address in the receiving agent memory.

FIG. 3 is a block diagram illustration of an embodiment of the present invention which prepares word data received from a transfer operation for storage in a receiving agent memory by re-aligning the word bytes in accordance with the storing address in the receiving agent memory. The circuit includes the same elements as the circuit of FIG. 2: an input word bus 300 comprising four eight-bit input lines, IN5, IN6, IN7 and IN8; a carrier register 320 comprising three eight-bit registers, CR4, CR5 and CR6; a data selector 340, comprising four 4:1 multiplexers, MUX5, MUX6, MUX7 and MUX8; an output register 360 comprising four eight-bit registers OR5, OR6, OR7 and OR8; and an output word bus 380 comprising four eight-bit output lines, OUT5, OUT6, OUT7 and OUT8. The two circuits differ in the manner in which the multiplexer inputs are connected to input word bus 300 and carrier register 320.

Register CR4 is connected to line IN6 to receive from input word bus 300 the eight bits of data which form the second byte (byte1) of any word placed on the bus. Registers CR5 and CR6 are similarly connected to lines IN7 and IN8 to receive from the input word bus the third byte (byte2) and fourth byte (byte3), respectively, of any word placed on the bus. Each of registers CR4, CR5 and CR6 functions to latch and hold received byte data when the leading edge of a logic pulse is received at the carrier register's CLOCK input.

Multiplexer MUX5 is connected to receive byte data from line IN5 (byte0) at its 00 input, the output of register CR6 at its 01 input, the output of register CR5 at its 10 input and the output of register CR4 at its 11 input. Multiplexer MUX6 is connected to receive byte data from input lines IN6 and IN5 at its 00 and 01 inputs, respectively, and the outputs of registers CR6 and CR5 at its 10 and 11 inputs, respectively. Multiplexer MUX7 is connected to receive byte data from input lines IN7, IN6 and IN5 at its 00, 01, 10 and 11 inputs, respectively, and the output of register CR3 at its 11 input. The remaining multiplexer, MUX8, receives byte data from input line IN8 at input 00, byte data from line IN7 at input 01, byte data from line IN6 at input 10 and byte data from line IN5 at input 11. Each multiplexer is responsive to logic signals received at inputs SAD1 and SAD0 to selectively couple one input to output register 360.

The circuit of FIG. 3 operates to re-align word byte data received on input word bus 300 for storage at a specified byte address within the receiving agent memory. Four different re-alignments are possible, depending upon the last two binary digits, SAD1 and SAD0, of the specified storage address.

Case 1: SAD1, SAD0 = 0,0

In this case, the storage address coincides with a word address so there is no need to byte-align the data prior to storage. Each word received on input bus 300 is passed directly through data selector 340 to output register 360 unaltered. The output register is responsive to the leading edge of a clock pulse received at its CLOCK input to latch the word received at its input, and provide the latched word to output word bus 380.

Case 2: SAD1, SAD0 = 0,1

Prior to receipt of word data on input bus 300, carrier register 320 and output register 360 must be cleared of all previously stored data. Data selector 340 operates in response to SAD1 and SAD0 to couple the output of register CR6 to the input of register OR5, line IN5 to the input of OR6, line IN6 to the input of OR7 and line IN7 to the input of OR8. Byte re-alignment begins when a first word, comprising word bytes A, B, C and D, is received on the input bus. The first rising edge of the clock signal latches bytes A, B, and C into registers OR6, OR7 and OR8, respectively, and byte D into register CR6. Register OR5 remains clear since no value was held in register CR6 prior to receipt of the first rising edge of the clock signal. The word appearing on the output bus consists of bytes 0, A, B and C. A second word comprising bytes E, F, G and H is then placed on the input bus.

The next rising edge of the clock signal latches byte D from register CR6 into register OR5; bytes E, F and G from the input word bus into registers OR6, OR7 and OR8, respectively, and byte H from the input word bus into register OR6. The word presented at the output bus now consists of bytes D, E, F and G.

The operation continues with each clock pulse producing an output word consisting of the concatenation of one byte previously stored in carrier register 220 and three bytes from the data word then residing on the input bus.

Case 3: SAD1, SAD0 = 1,0

Carrier register 320 and output register 360 must be cleared of all previously stored data to begin operation. SAD1 and SAD0 direct Data selector 340 to couple the output of register CR5 to the input of register OR5, the output of register CR6 to the input of register OR6, line IN5 to the input of OR7 and line IN6 to the input of register OR8. Byte re-alignment begins when a first word, comprising word bytes A, B, C and D, is received on the input bus. The first rising edge of the clock signal latches bytes A and B into registers OR7 and OR8, respectively, and bytes C and D into registers CR5 and CR6, respectively. Registers OR5 and OR6 remain clear since no values were held in registers CR5 and CR6 prior to receipt of the first rising edge of the clock signal. The word appearing on the output bus consists of bytes 0, 0, A and B. A second word comprising bytes E, F, G and H is then placed on the input bus.

The next rising edge of the clock signal latches byte C from register CR5 into register OR5, byte D from register CR6 into register OR6, byte E from the input line IN5 into register OR7, byte F from line IN6 into register OR8, byte G from line IN7 into register OR6 and byte H from line IN8 into register CR6. The word presented at the output bus now consists of bytes C, D, E and F.

The operation continues with each clock pulse producing an output word consisting of the concatenation of two bytes previously stored in carrier register 220 and two bytes from the data word then residing on the input bus.

Case 4: SAD1, SAD0 = 1,1

As in the prior cases, carrier register 320 and output register 360 must be cleared of all previously stored data before beginning operation. Data selector 340, in response to signals SAD1 and SAD0, connect the output of registers CR4, CR5 and CR6 to the inputs of register OR5, OR6 and OR7, respectively, and line IN5 to the input of register OR8. Byte re-alignment begins when a first word, comprising word bytes A, B, C and D, is received on the input bus. The first rising edge of the clock signal latches bytes A into register OR8 and bytes B, C and D into register CR4, CR5 and CR6, respectively. Register OR5, OR6 and OR7 remain clear at this time. The word first appearing on the output bus consists of bytes 0, 0, 0 and A. A second word comprising bytes E, F, G and H is then placed on the input bus.

The next rising edge of the clock signal latches bytes B, C and D from register CR4, CR5 and CR6 into register OR5, OR6 and OR7, respectively; byte E from the input word bus into register OR8; and and bytes F, G and H from the input word bus into registers CR4, CR5 and CR6, respectively. The word presented at the output bus now consists of bytes B, C, D and E.

The operation continues with each clock pulse producing an output word consisting of the concatenation of three bytes which were previously stored in carrier register 220 and one byte from the data word then residing on the input bus.

It can thus be seen that there has been provided by the present invention a new and improved apparatus which re-aligns multi-byte word data during transfer operations to correct problems which arise when the fetching address or storing address of the word data to be transferred does not start at a word-boundary location.

Although the presently preferred embodiment of the invention has been described, it will be understood that various changes may be made within the scope of the appended claims. For example, the apparatus as shown and described in FIGS. 2 and 3 realigns four-byte word data. Circuits embodying the present invention could also be constructed to byte align data words of lengths other than four bytes.

What is claimed is:

1. Apparatus for byte-aligning multiple-byte data words, wherein each data word includes first, second, third and fourth bytes, said apparatus comprising:
an input word bus;
an output word bus;

means connected to receive word byte data from said input bus for latching and holding byte data obtained from a fist data word appearing on said input bus, said latching means comprising a first carrier register connected to receive from said input word bus the second byte of any data word appearing on said word bus; a second carrier register connected to receive from said input word bus the third byte of any data word appearing on said word bus; and a third carrier register connected to receive from said input word bus the fourth byte of any data word appearing on said word bus; and means connected to receive word byte data from said latching means and said input bus for selecting byte data from said latch means and a second data word appearing on said input bus and combining said selected byte data to form a re-aligned data word, said selecting means further including output means for providing said selected byte data to said output bus, said selecting means comprising a first 4:1 multiplexer connected to receive as inputs the first byte of any data word appearing on said input bus and the output of said first, second and third carrier registers; a second 4:1 multiplexer connected to receive as inputs the first and second bytes of any data word appearing on said input bus and the output of said first and second carrier registers; a third 4:1 multiplexer connected to receive as inputs the first, second and third bytes of any data word appearing on said input bus and the output of said first carrier register; and a fourth 4:1 multiplexer connected to receive as inputs the first, second, third and fourth bytes of any data word appearing on said input bus.

2. Apparatus according to claim 1 wherein said input bus receives word data not aligned along word boundaries and said output bus provides word boundary byte-aligned word data, and wherein:

said first multiplexer is connected to receive the first byte of any data word appearing on said input bus at said first multiplexer's 00 input, and the outputs of said first, second and third carrier registers at said first multiplexer's 01, 10 and 11 inputs, respectively;

said second multiplexer is connected to receive the first and second bytes of any data word appearing on said input bus at said second multiplexer's 11 and 00 inputs, respectively, and the outputs of said second and third carrier registers at said second multiplexer's 01 and 10 inputs, respectively;

said third multiplexer is connected to receive the first, second and third bytes of any data word appearing on said input bus at said third multiplexer's 10, 11 and 11 inputs, respectively, and the output of said third carrier register at said second multiplexer's 01 input;

said fourth multiplexer is connected to receive the first, second, third and fourth bytes of any data word appearing on said input bus at said fourth multiplexer's 01, 10 11 and 00 inputs, respectively; and said multiplexers share a common set of select lines, said select lines being connected to receive byte address information regarding the location within said first memory of the first word byte to be byte-aligned.

3. Apparatus according to claim 1 wherein said input bus receives word-boundary byte-aligned word data and said output bus provides re-aligned word data, wherein:

said first multiplexer is connected to receive the first byte of any data word appearing on said input bus at said first multiplexer's 00 input, and the outputs of said first, second and third carrier registers at said first multiplexer's 11, 10 and 01 inputs, respectively;

said second multiplexer is connected to receive the first and second bytes of any data word appearing on said input bus at said second multiplexer's 01 and 00 inputs, respectively, and the outputs of said second and third carrier registers at said second multiplexer's 11 and 10 inputs, respectively;

said third multiplexer is connected to receive the first, second and third bytes of any data word appearing on said input bus at said third multiplexer's 10, 01 and 00 inputs, respectively, and the output of said third carrier register at said second multiplexer's 11 input;

said fourth multiplexer is connected to receive the first, second, third and fourth bytes of any data word appearing on said input bus at said fourth multiplexer's 11, 10, 01 and 00 inputs, respectively;

each of said multiplexers shares a common set of select lines, said select lines being connected to receive byte address information regarding the location within said second memory wherein the first re-aligned word byte is to be stored.

4. Apparatus for word boundary byte-aligning four-byte word data received from a first memory device and providing byte-aligned word data to a second memory device, said apparatus comprising:

an input word bus;

a first carrier register connected to receive from said input word bus the second byte of any data word appearing on said word bus;

a second carrier register connected to receive from said input word bus the third byte of any data word appearing on said word bus;

a third carrier register connected to receive from said input word bus the fourth byte of any data word appearing on said word bus;

a first 4:1 multiplexer connected to receive as inputs the first byte of any data word appearing on said input bus and the output of said first, second and third carrier registers;

a second 4:1 multiplexer connected to receive as inputs the first and second bytes of any data word appearing on said input bus and the output of said first and second carrier registers;

a third 4:1 multiplexer connected to receive as inputs the first, second and third bytes of any data word appearing on said input bus and the output of said first carrier register;

a fourth 4:1 multiplexer connected to receive as inputs the first, second, third and fourth bytes of any data word appearing on said input bus;

each of said multiplexers having a single output;

said multiplexers sharing a common set of two select lines for electing the four multiplexer inputs to be gated to said multiplexer outputs;

first, second, third and fourth output registers connected to receive the output from said first, second, third and fourth multiplexers, respectively; and an output word bus connected to receive the output of said output registers.

5. Apparatus for byte-aligning multiple-byte data words, said apparatus comprising:
an input word bus;
first latching means comprising:
an input for receiving a clock signal;
a first carrier register connected to receive from said input word bus the second byte of any data word appearing on said word bus;
a second carrier register connected to receive from said input word bus the third byte of any data word appearing on said word bus; and
a third carrier register connected to receive from said input word bus the fourth byte of any data word appearing on said word bus;
said carrier registers being responsive to the receipt of said clock signal at said first latching means input to latch and hold received word byte data;
a data selector comprising:
inputs for receiving first and second select signals;
a first 4:1 multiplexer connected to receive as inputs the first byte of any data word appearing on said input bus and the output of said first, second and third carrier registers;
a second 4:1 multiplexer connected to receive as inputs the first and second bytes of any data word appearing on said input bus and the output of said first and second carrier registers;
a third 4:1 multiplexer connected to receive as inputs the first, second and third bytes of any data word appearing on said input bus and the output of said first carrier register; and
a fourth 4:1 multiplexer connected to receive as inputs the first, second, third and fourth bytes of any data word appearing on said input bus;
each of said multiplexers having a single output and being responsive to said select signals to gate a selected multiplexer input to said multiplexer output;
second latching means comprising:
an input for receiving said clock signal; and
first, second, third and fourth output registers connected to receive the outputs from said first, second, third and fourth multiplexers, respectively;
said output registers being responsive to the receipt of said clock signal at said second latching means input to latch and hold received word byte data; and
an output word bus connected to receive the output of said second latching means.

* * * * *